US006282326B1

(12) United States Patent
Lee et al.

(10) Patent No.: US 6,282,326 B1
(45) Date of Patent: Aug. 28, 2001

(54) ARTIFACT REMOVAL TECHNIQUE FOR SKEW CORRECTED IMAGES

(75) Inventors: Yongchun Lee, Rochester; Peter Rudak, Hilton; Daniel T. Jaramillo, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/211,125

(22) Filed: Dec. 14, 1998

(51) Int. Cl.[7] ........................................................ G06K 9/36
(52) U.S. Cl. ............................................. 382/289; 382/275
(58) Field of Search ..................................... 382/275, 289, 382/270, 274, 174, 283, 308; 358/463

(56) References Cited

U.S. PATENT DOCUMENTS

| 4,912,559 | * | 3/1990 | Ariyoshi et al. | 358/261.1 |
| 5,054,098 | * | 10/1991 | Lee | 382/46 |
| 5,214,470 | * | 5/1993 | Denber | 355/75 |
| 5,583,659 | * | 12/1996 | Lee et al. | 358/455 |
| 5,949,901 | * | 9/1999 | Nichani et al. | 382/149 |
| 5,956,435 | * | 9/1999 | Buzug et al. | 382/283 |
| 6,035,072 | * | 3/2000 | Read | 382/175 |

* cited by examiner

*Primary Examiner*—Yon J. Couso
(74) *Attorney, Agent, or Firm*—David A. Novais; Nelson Adrian Blish

(57) ABSTRACT

A digital image processing method and system is adapted to remove diagonally disposed artifacts such as lines, dots, dashes etc., from a scanned skew corrected document or image. The system and method converts a captured skew corrected image into first and second binary images and generates a map indicative of a difference between the first and second binary images. Black pixels in the map are projected based on a skew angle of the image to form a projection profile, and an image based on the map, detected peaks in the projection profile and the pixels is created.

14 Claims, 20 Drawing Sheets

FIG. 3A

| (i−1)(j−1) | i(j−1) | (i+1)(j−1) |
|---|---|---|
| (i−1)j | (i,j) | (i+1)j |
| (i−1)(j+1) | i(j+1) | (i+1)(j+1) |

ARTIFACT REMOVAL TECHNIQUE FOR SKEW CORRECTED IMAGES

CROSS REFERENCE TO RELATED APPLICATIONS

The present application is related to U.S. patent application Ser. No. 08/739,076, filed Oct. 25, 1996, by Yongchun Lee titled "A Look-Up-Table (LUT) Technique For Conversion Of A Bitmap Into Polygonal Representation", U.S. patent application Ser. No. 09/006,565, filed Jan. 14, 1998, by Yungchun Lee, Peter Rudak and Joseph M. Basile titled "Method and System For Detection Of Skew Angle And Black Border Of A Document Image In A Production Scanning Environment", and to U.S. Patent Application (Docket No. 78434) by Peter Rudak, Yongchun Lee and James M. Stefanko titled "An Image Processing System For Reducing Vertically Disposed Patterns On Images Produced by Scanning" being filed concurrently herewith.

FIELD OF THE INVENTION

The present invention relates to an image processing method and system which removes diagonally disposed artifacts such as lines on skew corrected images produced by scanning an original document, without loss of image information.

BACKGROUND OF THE INVENTION

Unexpected vertical black patterns or artifacts such as lines, dots, dashes, etc., have been a common image artifact in binary document images produced by production paper scanners. The vertical black patterns are not part of the original document image, however, the patterns are the result of pieces of dust or dirt blocking light between an illumination light source and the paper documents being scanned. For example, pieces of dust or dirt which come to rest on transparent image guides in an illumination path of the scanner will result in shaded lines upon the document moving through the scanner. When the document is electronically captured by a CCD device, the shaded lines will appear in the digital document image. The shaded vertical lines within a grey scale image will be indistinguishably treated as part of image content. After an adaptive thresholding is applied to the grey scale image, the shaded lines will show up as black lines in the binary image. A method which removes unwanted vertically disposed artifacts is described in the above-mentioned co-pending application Docket No. 78434.

When a paper document is scanned by a production scanner, the resulting digital image is often skewed. The causes of a skewed image are either that the document is not fed properly, or the application of uneven paper carrying forces in a scanning system while transporting a paper document. The skew of a document image produces an unpleasant effect on viewing an image, hence an image skew correction is becoming a desired feature in a document scanning system (see, for example, U.S. Ser. No. 09/006, 565.

If the phenomenon of vertical line artifacts occur in a skew image or document 1 as shown in FIG. 1A, a vertical line artifact 3 will turn into a diagonal line artifact 5 in the skew corrected image or document 1' as shown in FIG. 1B.

SUMMARY OF THE INVENTION

An object of the present invention is to provide for an artifact detection and removal system and method for skew corrected images. The method includes the steps of (1) applying an edge-based adaptive thresholding method twice with different contrast parameter settings to convert a skew corrected image such as a gray scale image into two binary images; (2) generating a bitmap of the difference from the two binary images; (3) projecting and accumulating black pixels in the two dimensional bitmap onto a straight line to form a projection profile; (4) detecting locations of local peaks (i.e., line locations) from the projection profile; (5) acquiring the equations of lines from the skew angle and the location values of the detected local peaks; (6) masking the black pixels whose coordinates are within a certain threshold distance along the equations of lines in the bitmap of the difference; and (7) reversing the pixels from a binary image based on the black pixels along the lines in the thresholded binary image.

The system and method of the present invention includes deskewing a captured document image such as a gray scale image; applying an edge-based adaptive thresholding technique with a normal contrast setting to extract every detail of image information; storing the resulting binary image, named as B1; applying the same edge-based adaptive thresholding technique with a low contrast setting which only extracts high contrast details of the image, named as B2; labelling the difference of B1 and B2, and storing the map of the difference, named as D; projecting the black pixels in the two dimensional bitmap (D) onto a one dimensional straight line, where the direction of projection is determined by the document skew angle; accumulating the black pixels to form a projection profile; locating the lines by detecting the local peaks in the projection profile, where the detected lines are represented by a set of equations of lines; masking the black pixels whose coordinates are within a certain threshold distance along the equations of lines in the bitmap (D) and resulting in a bitmap of lines, named as V; reading the binary image (B1) and the map of the lines (V); and reversing the pixels in the binary image B1 at the corresponding black pixel locations in V.

The present invention relates to an image processing method for processing skew corrected images which comprises the steps of: converting a captured skew corrected image into first and second binary images; generating a map indicative of a difference between the first and second binary images; projecting black pixels in the map onto a line to form a projection profile; and reversing pixels in the first binary images based on the projection profile.

The present invention further relates to an image processing method for processing skew corrected images which comprises the steps of: converting a captured skew corrected image into first and second binary images; comparing the first and second binary images and generating a map indicative of a difference between the first and second binary images; projecting black pixels in the map onto a line to form a projection profile, wherein a direction of projection of the line is based on an original skew angle of the captured image; detecting peaks in the projection profile which are above a specified threshold and generating a line based on the detected peaks, wherein the detected peaks correspond to artifacts on the captured image; masking black pixels in the map which are adjacent to the generated line; and reversing pixels in the first binary image based on the masked pixels.

The present invention further relates to an image processing method for processing a skewed captured image. The method comprises the steps of: deskewing the captured image; extracting image information from the captured image and storing a resulting image as a first binary image; extracting high contrast details from the captured image and storing a resulting image as a second binary image; comparing the first and second binary images and generating a map indicative of a difference between the first and second binary images; projecting black pixels in the map onto a line to form a projection profile, wherein a direction of projection of the line is based on a skew angle of the skewed captured image; detecting peaks in the projection profile which are above a specified threshold and generating a line based on the detected peaks, wherein the detected peaks correspond to artifacts on the captured image; masking black pixels in the map which are adjacent to the generated line; and reversing pixels in the first binary image based on the masked pixels.

The present invention further relates to an image capture assembly which comprises: an image capture section which captures an image; an image deskewing section which is adapted to correct a captured image that is skewed so as to provide for a captured skewed corrected image; a conversion section which converts the skewed corrected image into digital image information indicative of the skewed corrected captured image; and a processing section which receives the digital information and changes the skewed corrected captured image into first and second binary images, wherein the processing section generates a map indicative of a difference between the first and second binary images, projects black pixels in the map onto a line which is oriented based on a skew angle of the captured image to form a projection profile, and reverses pixels in said first binary image based on said projection profile.

BRIEF DESCRIPTION OF THE DRAWINGS

FIG. 3A depicts a 3-by-3 matrix of pixel location definition used in determining gradient strength for current pixel (i,j);

FIG. 3B depicts a graphical representation of an N-by-N neighborhood of pixels centered about a current pixel(i,j) in an image intensity record;

FIG. 3C depicts a graphical representation of an (N-2)-by-(N-2) neighborhood of pixels centered about pixel position(i,j) in an image intensity gradient record;

FIG. 7C is the thresholded image (B1) with normal contrast parameter setting;

FIG. 7D is the thresholded image (B2) with low contrast parameter setting;

FIG. 7H is the final result of the thresholded image (B).

DETAILED DESCRIPTION OF THE INVENTION

Figure 1A:
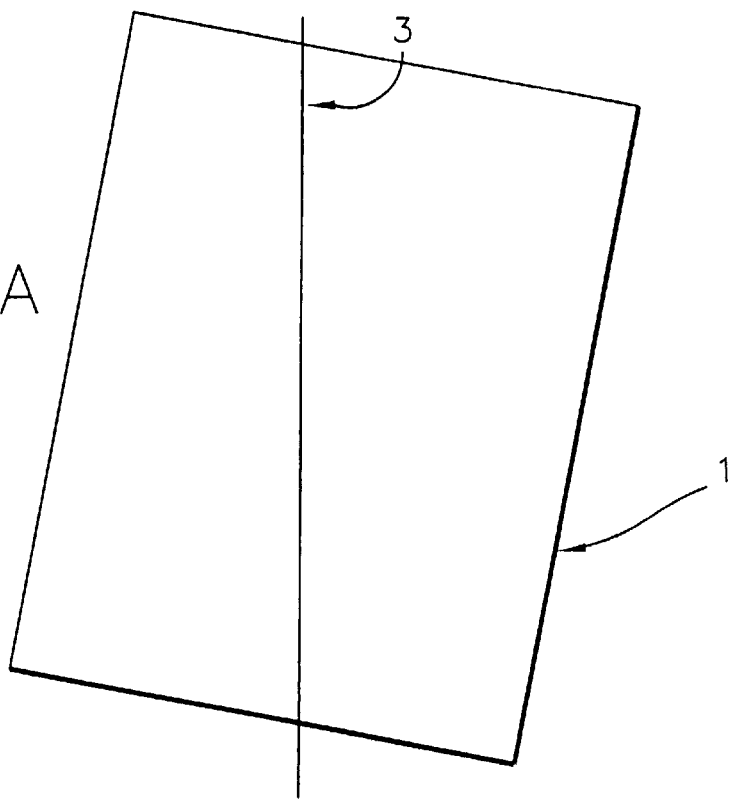
FIG. 1A is a graphical example of a vertical line artifact due to pieces of dust in a skewed document.
Figure 1B:
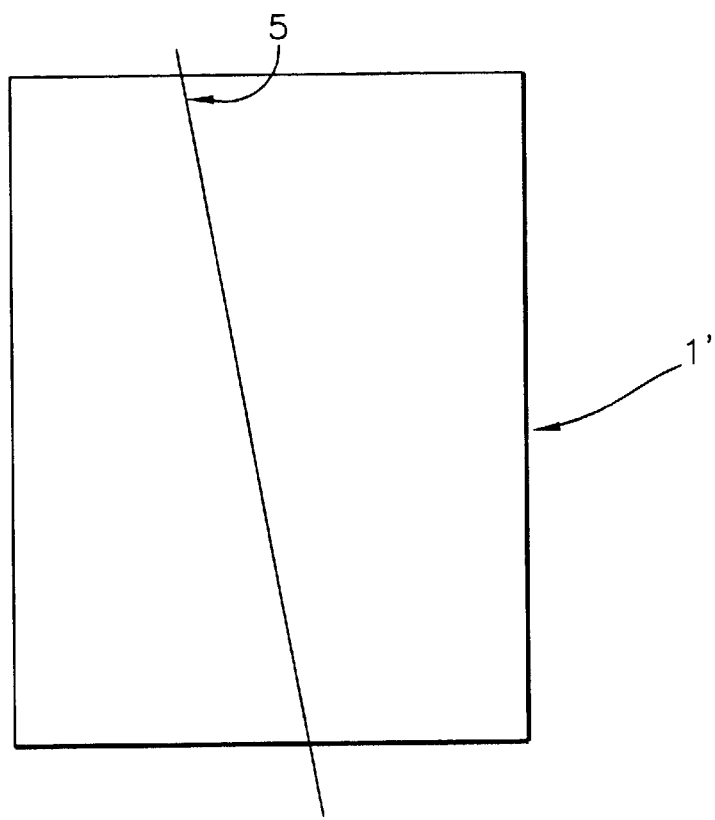
FIG. 1B is a graphical example of a diagonal line artifact in a skew corrected document.
Figure 2:
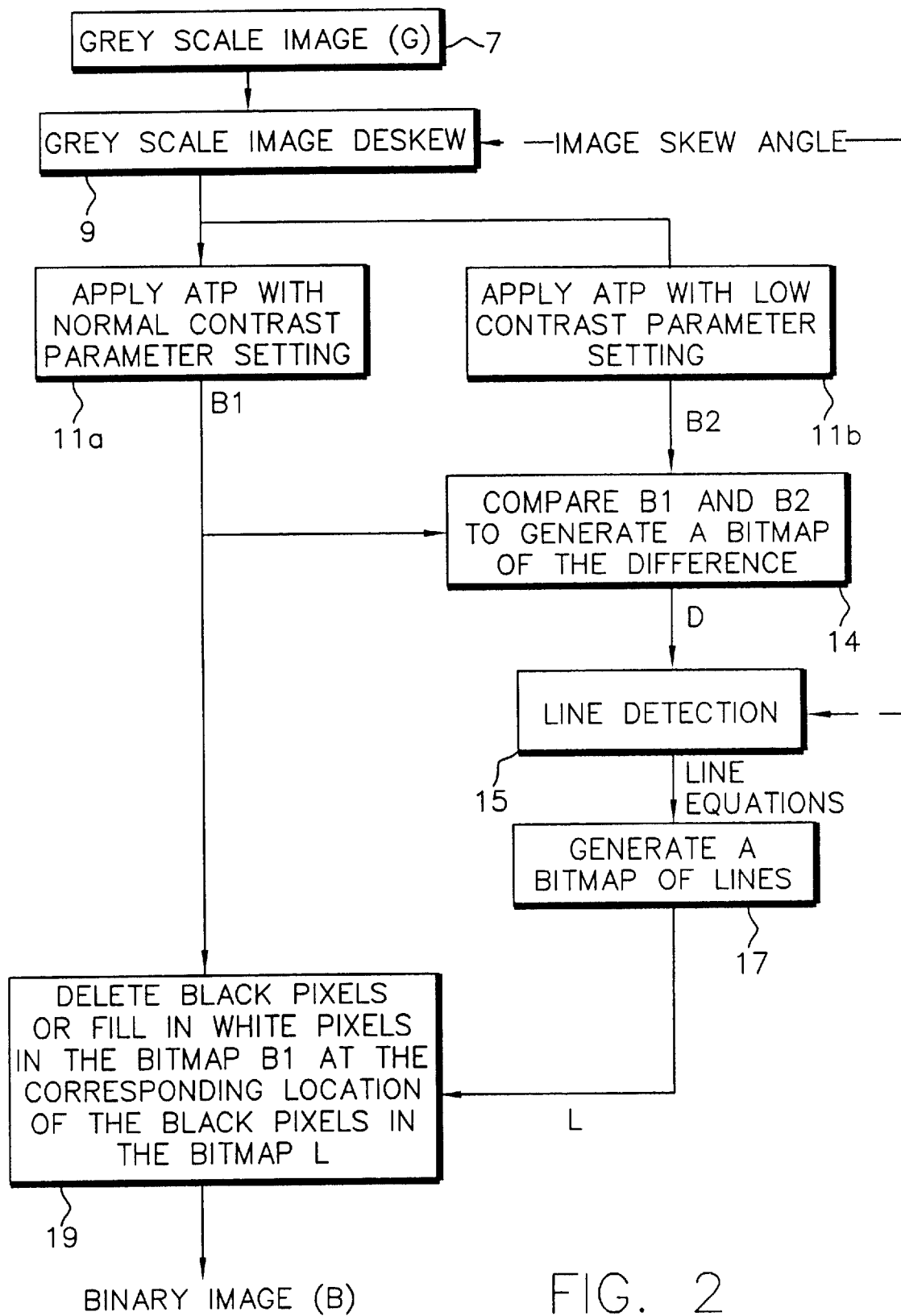
FIG. 2 is a flowchart of the steps of an image processing system for converting a skew corrected gray scale image into a binary image with minimal image artifacts.

Referring now to the drawings, wherein like reference numerals represent identical or corresponding parts throughout the several views, a block diagram of a line removal method that performs image deskewing such as gray scale image deskewing and thresholding with minimal line artifacts is shown in FIG. 2. Although the invention is described with respect to line removal the invention is not limited thereto. The invention is applicable to the removal of lines, dashes, dots, marks, etc., and any combination thereof. In the method of the present invention, image data such as digital gray scale image data is received as input (step 7) and the method and system operate as follows: (1) Gray scale image deskewing with a known skew angle is applied (step 9); (2) An edge-based image thresholding (ATP) is first applied (step 11a) to convert the gray scale image into a binary image (B1) with normal contrast parameter setting which extracts full details of image information; (3) The edge-based image thresholding is applied again (step 11b) to convert the gray scale image into another binary image (B2) with low contrast parameter setting which only extracts high-contrast objects; (4) The two binary images, B1 and B2, are compared pixel-by-pixel (step 14), identifying a pixel as a "black" pixel if there is a difference and "white" if there is no difference, to generate a bitmap of the difference, named as D, between the two binary images B1 and B2; (5) Line detection in the bitmap D is made (step 15) by firstly projecting the black pixels in the bitmap D onto a straight line whose angle is equal to a negative value of the skew angle in the original image, then detecting the locations of local peaks in the projection profile, such that the number of the detected peaks reflects the number of the detected lines; (6) A bitmap L of the detected lines is generated (step 17) by masking the black pixels in the bitmap D which are adjacent to the detected lines; and (7) A final thresholded image, binary image B, is obtained (step 19) by removing corresponding black pixels and by filling in corresponding white pixels in the thresholded image B1 in the location of the black pixels in the bitmap L.

Figure 2A:
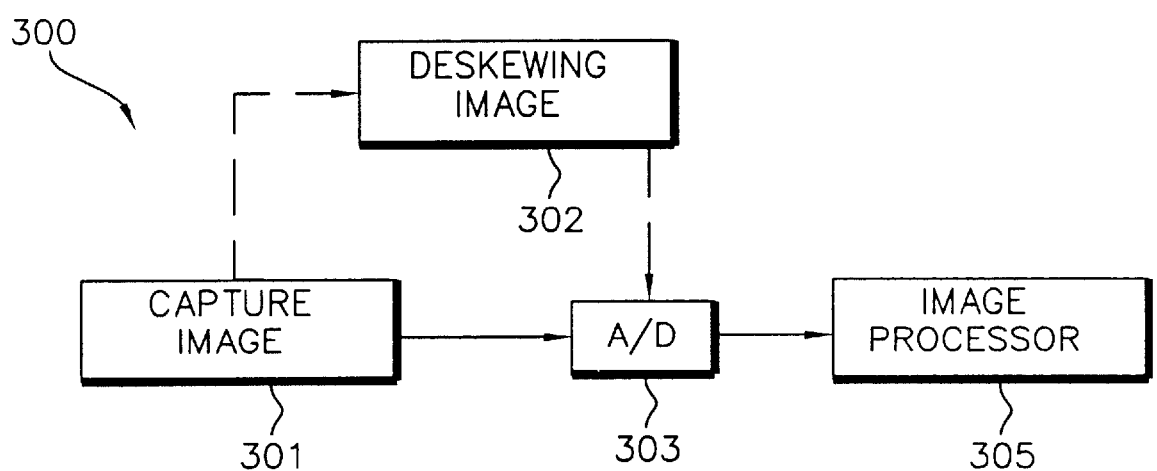
FIG. 2A is a graphical representation of an image capture assembly in accordance with the present invention.

FIG. 2A is a schematic illustration of an image capture assembly 300 which processes images in accordance with the described and illustrated features of the invention. Image capture assembly 300 can be a scanner which includes an image capture section 301 in the form of, for example, a charge coupled device that captures an image, an image deskewing or correction section 302 (see, for example, U.S. Ser. No. 09/006,565) which corrects a captured image that is skewed so as to provide for a skew corrected image, and a conversion section 303 in the form of, for example, an A/D converter which converts the captured image into digital information indicative of the captured image. The digital information is sent to a processing section 305 which processes the digital information as described with reference to FIG. 2, and as will be further described with reference to FIGS. 3, 3A, 4, 5 and 6.

Edge-Based Adaptive Image Thresholding

Figure 3:
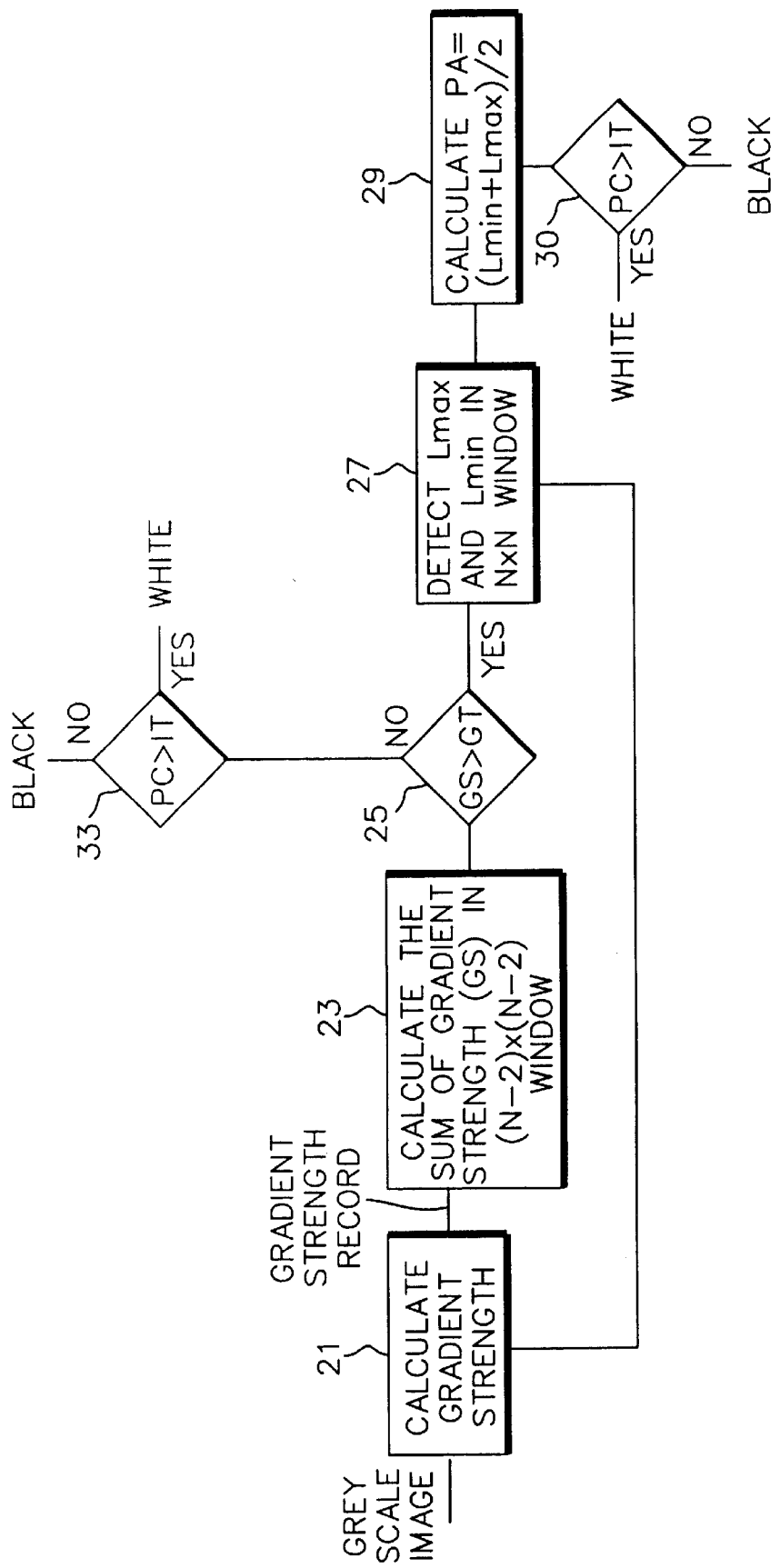
FIG. 3 is a flowchart outlining the steps of an edge-based adaptive thresholding processing (ATP)

FIG. 3 is block diagram of an image processing system that performs the edge-based adaptive thresholding. The thresholding method receives as input the digital image from a scanner and operator specified input parameters IT (intensity threshold) and GT (gradient threshold) and includes the following steps:

First, Sobel gradient operator is applied to the image intensity record to produce a gradient strength record (step 21). The Sobel operator works on a 3-by-3 window of pixels, as shown in FIG. 3A, to compute the horizontal and vertical intensity gradients, GX(i,j) and GY(i,j) at pixel position (i,j). The gradient strength GS(i,j) at pixel position (i,j) is the absolute sum of the horizontal and vertical intensity gradients, GX(i,j) and GY(i,j) respectively. The GX(i,j) and GY(i,j) are defined as follows:

$$GX(i,j)=L(i+1,j-1)+2L(i+1,j)+L(i+1,j+1)-L(i-1,j-1)-2L(i-1,j)-L(i-1,j+1);$$

$$GY(i,j)=L(i-1,j+1)+2L(i,j+1)+L(i+1,j+1)-L(i-1,j-1)-2L(i,j-1)-L(i+1,j-1);$$

$$GS(i,j)=|GX(i,j)|+|GY(i,j)|,$$

where

GS(i,j)=Gradient strength record at pixel position (i,j) after gradient operation.

L(i,j)=Image intensity at pixel position (i,j).

Second, the minimal intensity—Lmin(i,j) and maximal intensity—Lmax(i,j) in a N-by-N window are measured (step 27) from the image intensity record as shown in FIG. 3B and the sum of gradient strength GS(i,j) in a (N−2)-by-(N−2) window, as shown in FIG. 3C, is calculated from the gradient strength (step 23 of FIG. 3). The sum of gradient GS(i,j) is defined as an area gradient. Next, the three feature values GS(i,j), Lmin(i,j), Lmax(i,j) are used for classifying the pixel at (i,j) into black or white in the image intensity record. The final process is extraction of black pixels (objects). The first step of extraction is the detection of pixels near an edge. A pixel at (i,j) near an edge is confirmed whenever the area gradient is high and larger than a predetermined value—a gradient threshold (GT) (step 25). After a pixel near an edge is found the pixel (the center pixel of the local window) is classified as black (object) when its intensity is smaller than the average of Lmin(i,j) and Lmax (i,j) (steps 29 and 30). That is, it is in the darker side of an edge. On the other hand, if its intensity is larger than the average (PA) of Lmin(i,j) and Lmax(i,j) it is classified into white (background). In case of an area gradient smaller than the gradient threshold (GT), such as a N×N window moving in a flat region, the classification is then made by a simple thresholding. That is, comparing the gray value of the pixel with another predetermined intensity threshold value (IT). If the gray value of a pixel is smaller than IT, the pixel is classified as black; otherwise it is treated as white background (step 33).

The image quality after thresholding by the technique is controlled by the user's selection of the two threshold (GT and IT) setting. The GT is set for classifying pixels in vicinity of edges and the IT is then set for classifying pixels in uniform regions. A low GT setting tends to extract edge pixels of light objects and a low IT setting inclines to classify pixels of a gray uniform region into white background. On the other hand, with a very high GT setting, the algorithm acts just like a fixed thresholding with threshold setting at IT. Since under this situation GT is always larger than the area gradient, the pixel classification of the image as shown in FIG. 3 is solely determined by comparing IT with the intensity at the pixel of interest. The technique can also produce an outline image by simply setting the IT to zero in which all pixels classify as white except the edge pixels where area gradients are larger than GT.

The Generation of a Map of Image Difference

Figure 4:
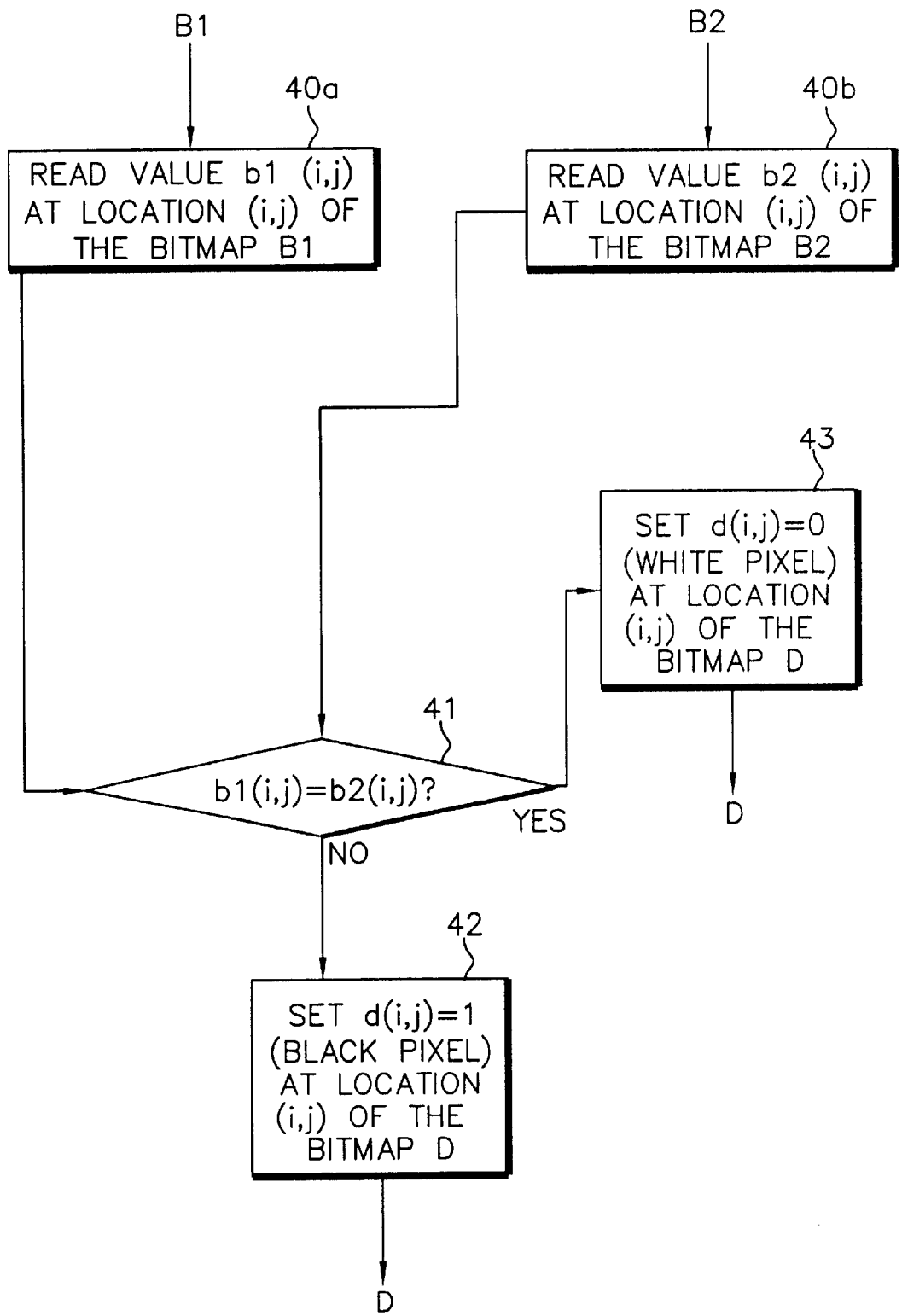
FIG. 4 is a flowchart of generating a bitmap of the difference between two binary images.

FIG. 4 is a block diagram of generating the map of image difference between the two thresholded images B1 and B2. As shown in FIG. 4, a bitmap value b1(i,j) which is either 1 (black) or 0 (white) at location (i,j) of the image B1 is read (step 40*a*), and a bitmap value b2(i,j) at the corresponding location (i,j) of the image B2 is also read (step 40*b*). If the value b1(i,j) is different from the value b2(i,j) (step 41), that is one is black and the other is white, then the value d(i,j) at location (i,j) of a new map D is marked as 1 (black pixel) (step 42), otherwise, it is marked as 0 (white pixel) (step 43). The process above is applied through every pixel location (i,j) in the images B1 and B2, and produces an image map D which indicates the difference of B1 and B2. The process indicates that only the low contrast or light objects are extracted and exhibited in the map of the difference.

Line Detection

Figure 5:
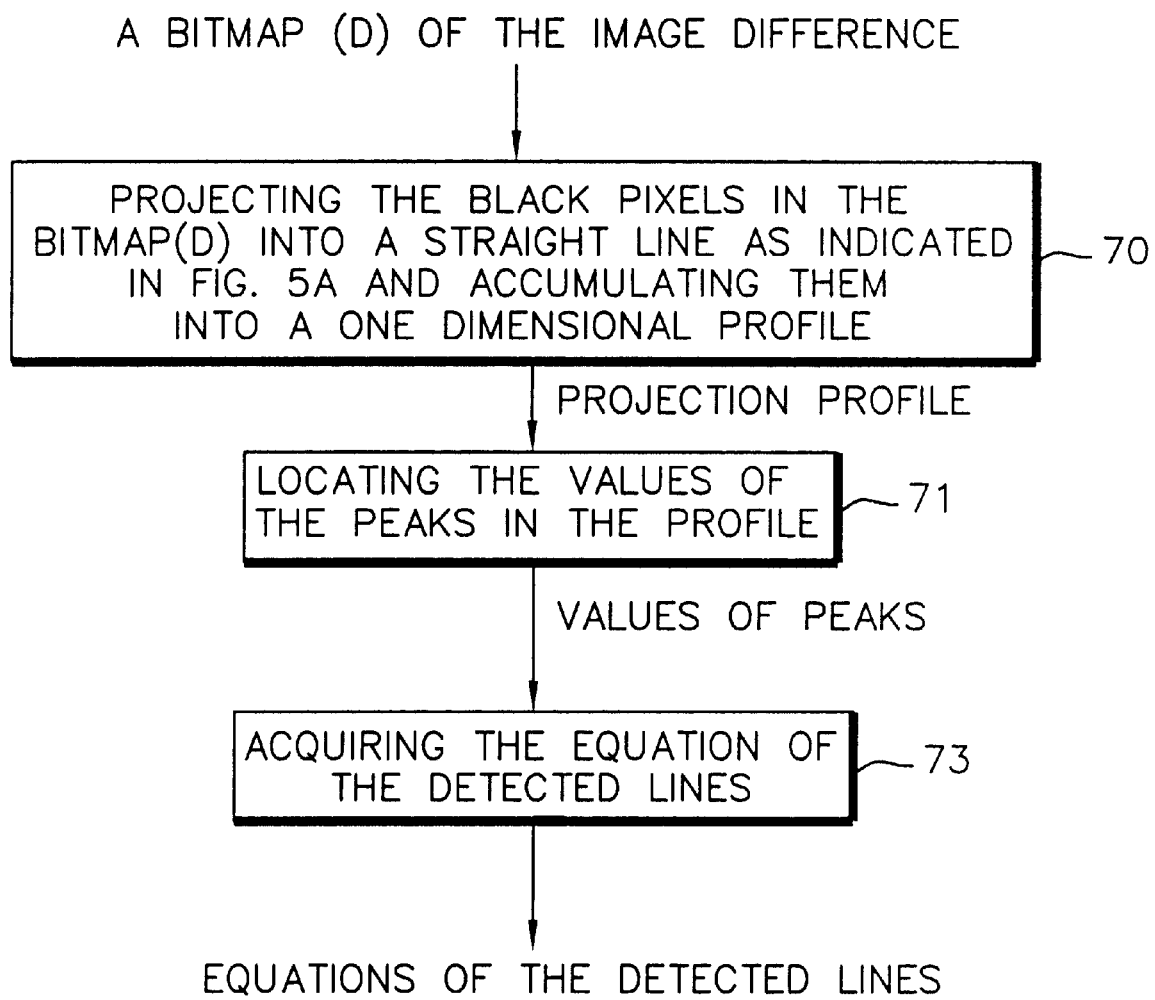
FIG. 5 is a flowchart of line detection.
Figure 5A:
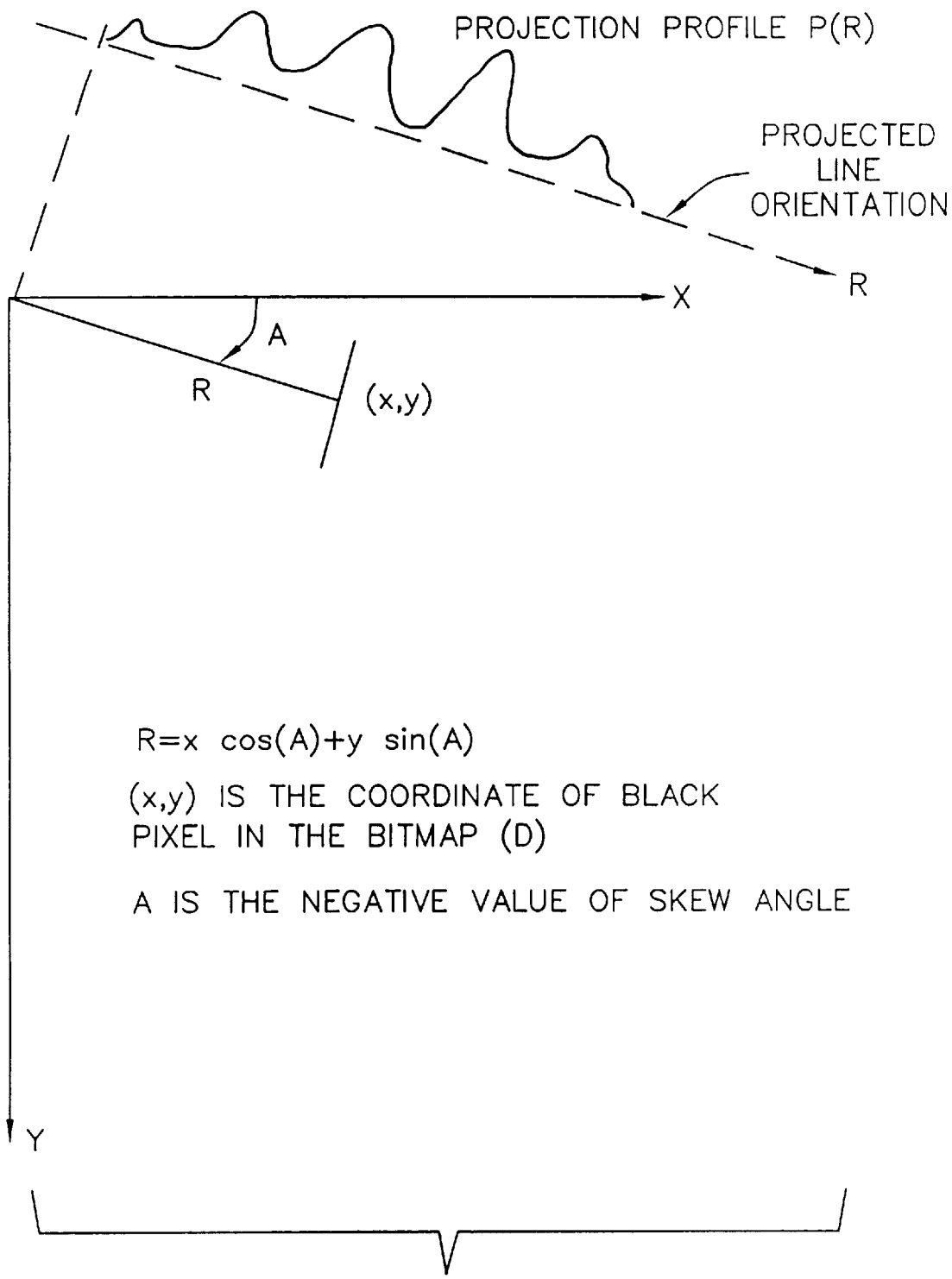
FIG. 5A is a graphical description of acquiring projection profile from a bitmap of the difference between two binary images.
Figure 5B:
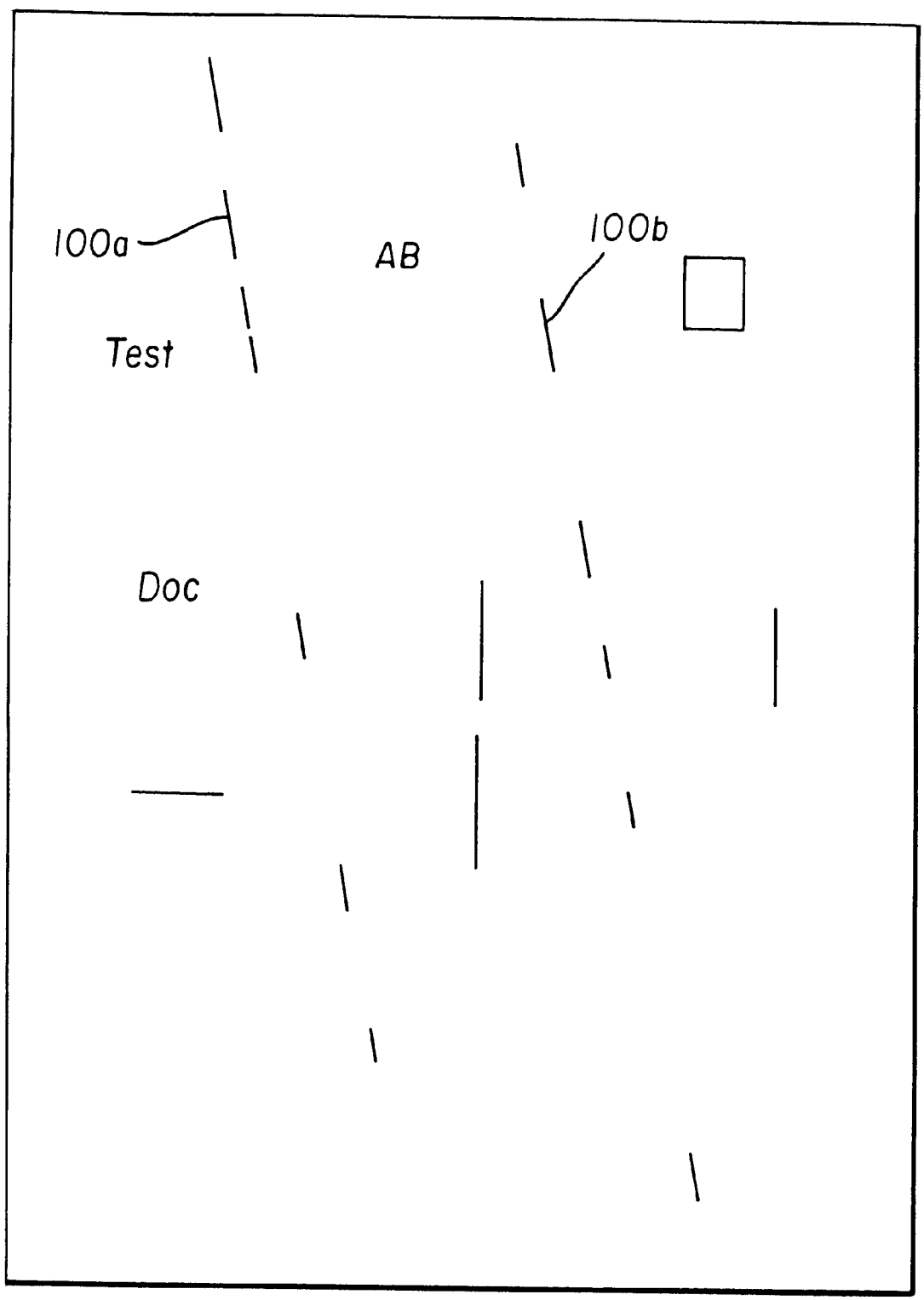
FIG. 5B is an example of a bitmap of the difference (D)
Figure 5C:
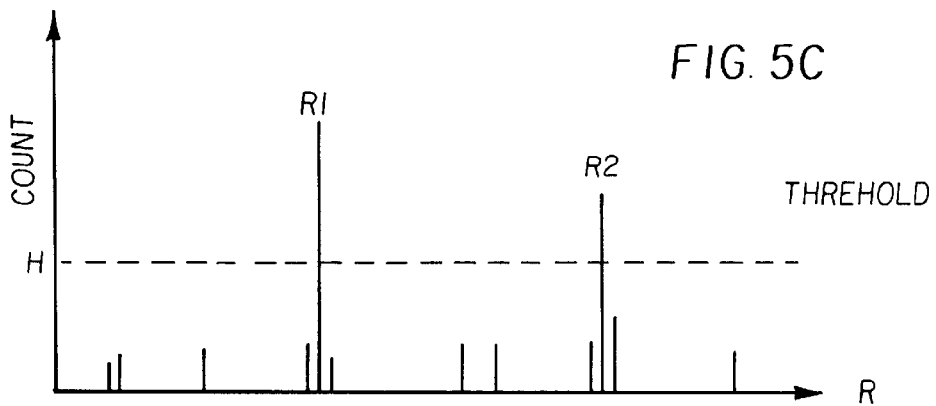
FIG. 5C shows the two detected peaks (R1 and R2) in the acquired projection profile of the bitmap (D) in FIG. 5B.
Figure 5D:
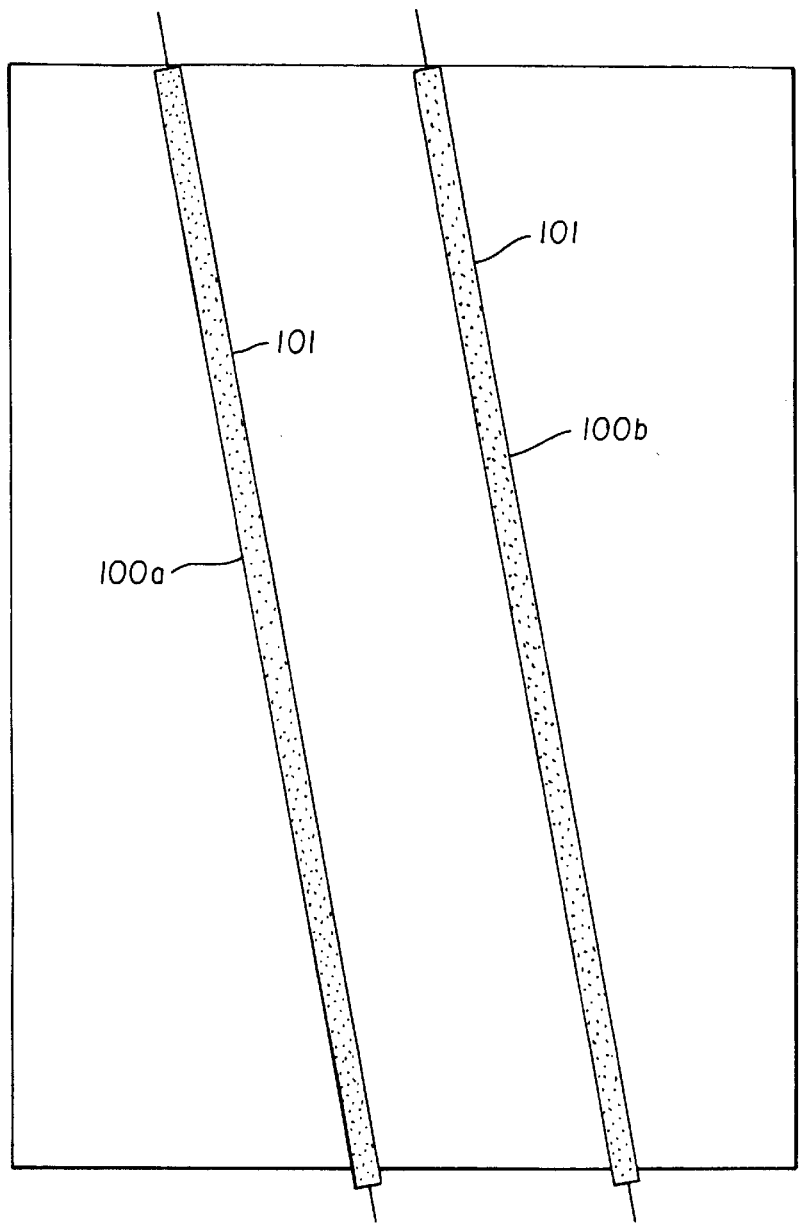
FIG. 5D shows the locations of the two detected lines in the bitmap.
Figure 5E:
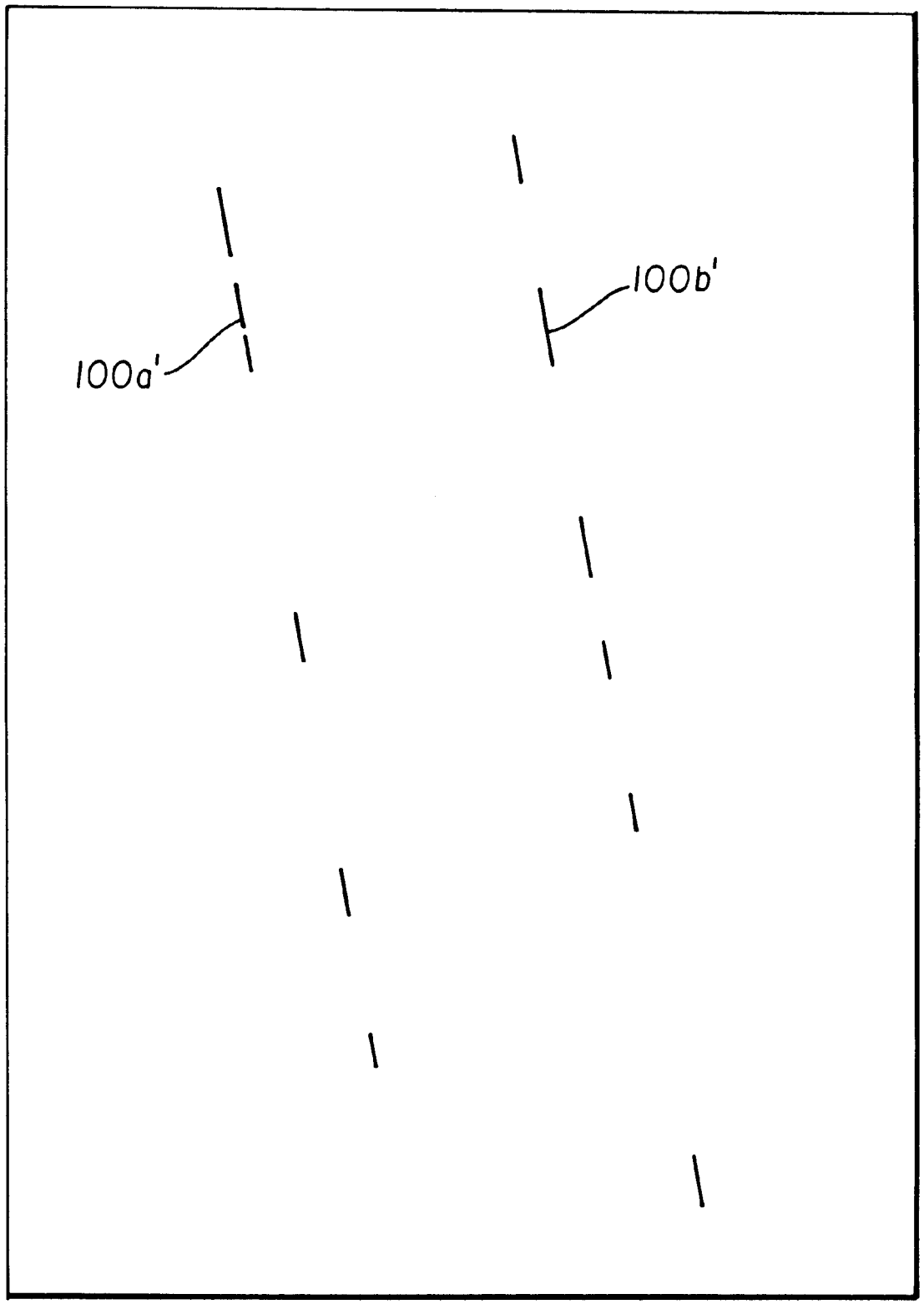
FIG. 5E shows the unwanted line pixels to be deleted from the bitmap (B1)

FIG. 5 is a block diagram of a pattern or artifact detection at a given orientation which will be described with respect to detecting lines but is applicable for detecting lines, dashes, dots, etc. and any combination thereof. The detection of lines is made by projecting the black pixels in the bitmap (D) into a straight line pointing at a given orientation as indicated in FIG. 5A (step 70), and accumulating them into a one dimensional projection profile P(R), where R is the projected line orientation at angle A. The projection profile is the frequency distribution of black pixels in a one dimensional diagonal plane. It permits one to easily locate the lines by detecting the peaks (step 71) in the one-dimensional frequency distribution. FIG. 5B is an example of a bitmap (D) with two detected lines or artifacts 100*a*, 100*b*. Its projection profile is shown in FIG. 5C. Two peaks which are above a specified threshold are detected at R1 and R2. The two detected peaks reflect the two detected lines or artifacts 100*a*, 100*b*. Their equations (step 73) are R1=X1*cos(A)+Y1*sin(A) and R2=X2*cos(A)+Y2*sin (A); respectively, where x and y are the Cartesian coordinates as defined in FIG. 5A. The two detected lines 100*a*, 100*b* are drawn in FIG. 5D. Two narrow gray stripes (101) of regions along the lines in FIG. 5D are set to mask the unwanted black line pixels in the bitmap (D) in FIG. 5B. The resulting line bitmap 100*a*', 100*b*' is shown in FIG. 5E.

Line Removal

Figure 6:
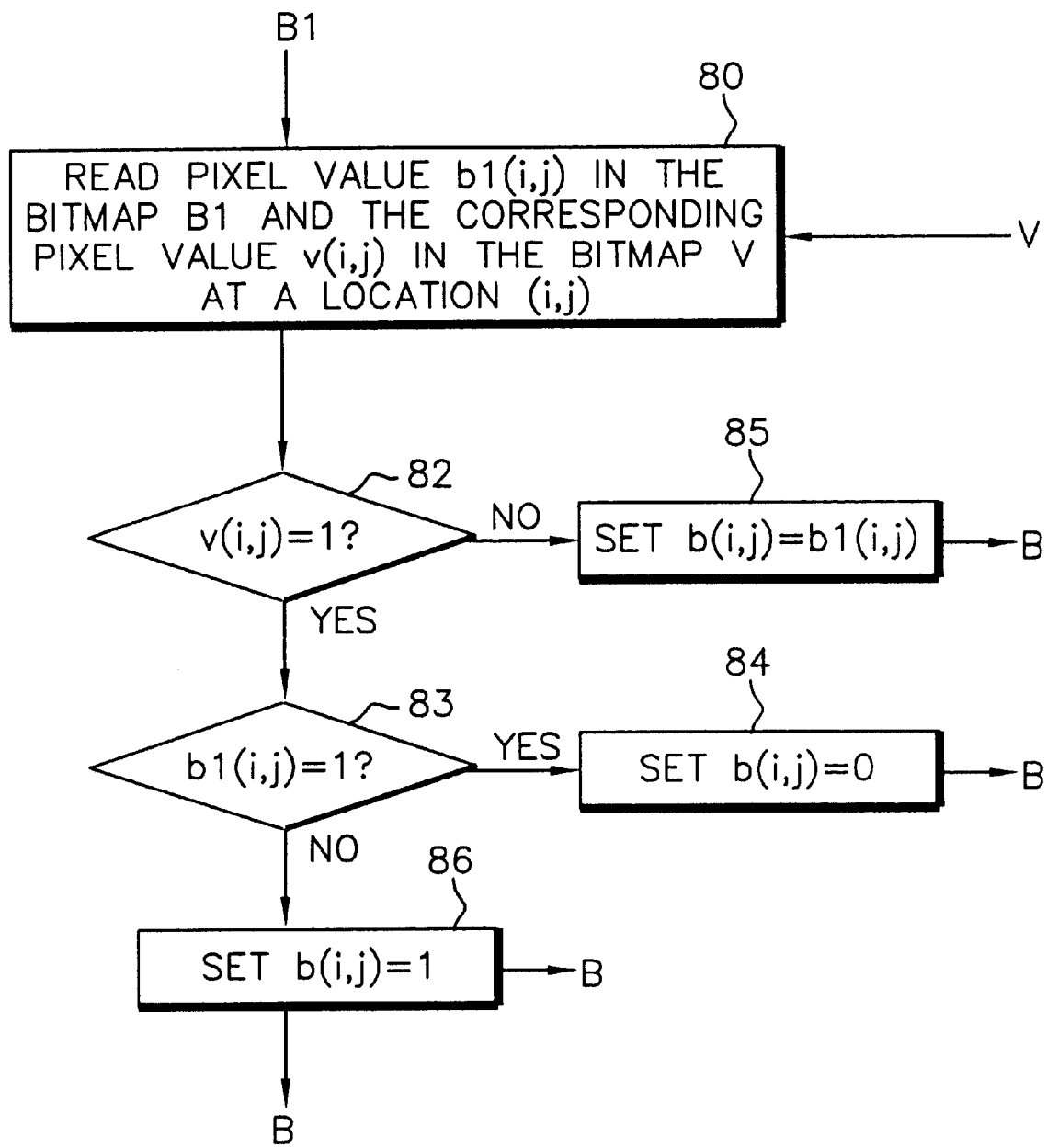
FIG. 6 is a flowchart of removing the black lines in a thresholded image.

FIG. 6 is a block diagram of a pattern or artifact removal process which will be described with respect to removing a line but is applicable for removing lines, dashes, dots, etc., and any combination thereof. In the process, the bitmap value b1(i,j) at location (i,j) in the image B1 is read, and the bitmap value v(i,j) at the corresponding location (i,j) in the bitmap V is also read (step 80). If the value v(i,j) is marked as "1" (step 82), in which "1" indicates black and "0"

indicates white, then the value b1(i,j) is examined (step 83). If the value v(i,j) is marked as "0", then b(i,j) is set equal to b1(i,j) (step 85). If the value b1(i,j) is marked as "1" (black pixel) (step 83), then the value b1(i,j) is turned into "0" (white) (step 84). On the other hand, if the value b1(i,j) is marked as "0", then the value b1(i,j) is turned into "1" (black) (step 86). The bitmap B is a copy of bitmap B1 after vertical line removal, where b(i,j) is the value of the bitmap B at location (i,j). The process is applied through every pixel location (i,j) in the images B1 and V, and produces a bitmap B whose lines are removed.

Demonstration of a Real Example

Figure 7A:
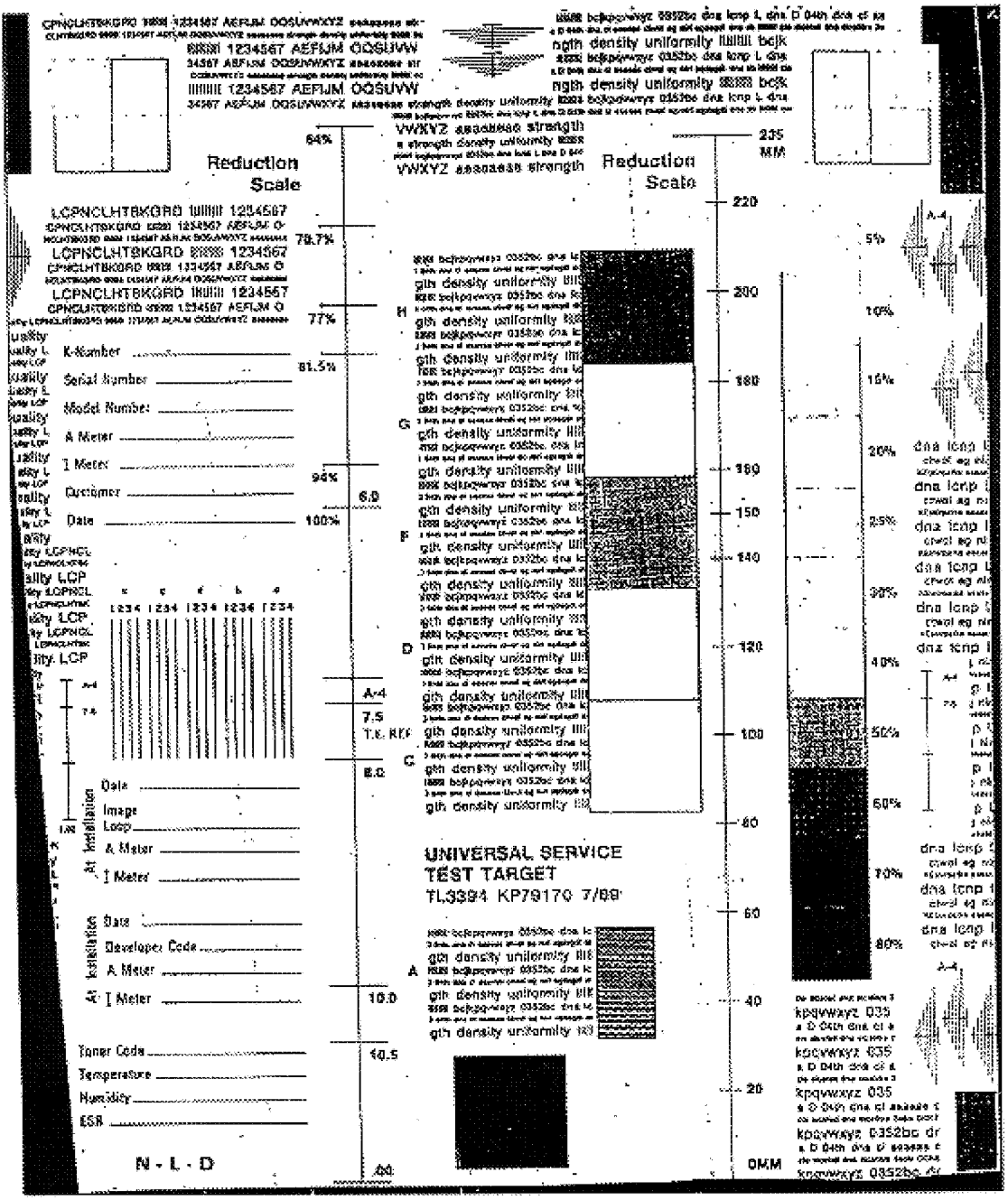
FIG. 7A is a real example of a scanned, skewed document image with 3.9 degree skew angle.
Figure 7B:
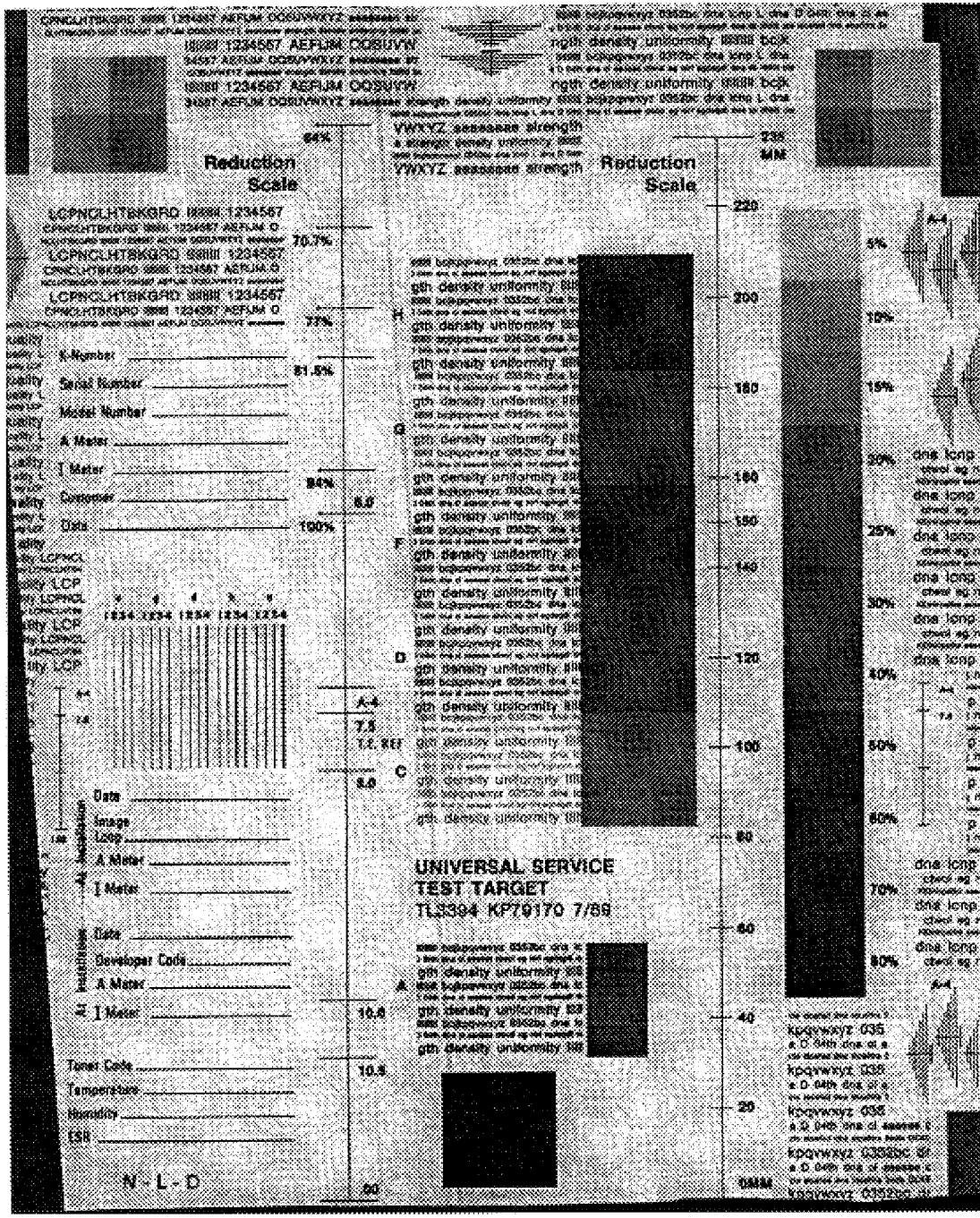
FIG. 7B is the resulting document image of skew correction for the image in FIG. 7A.
Figure 7C:
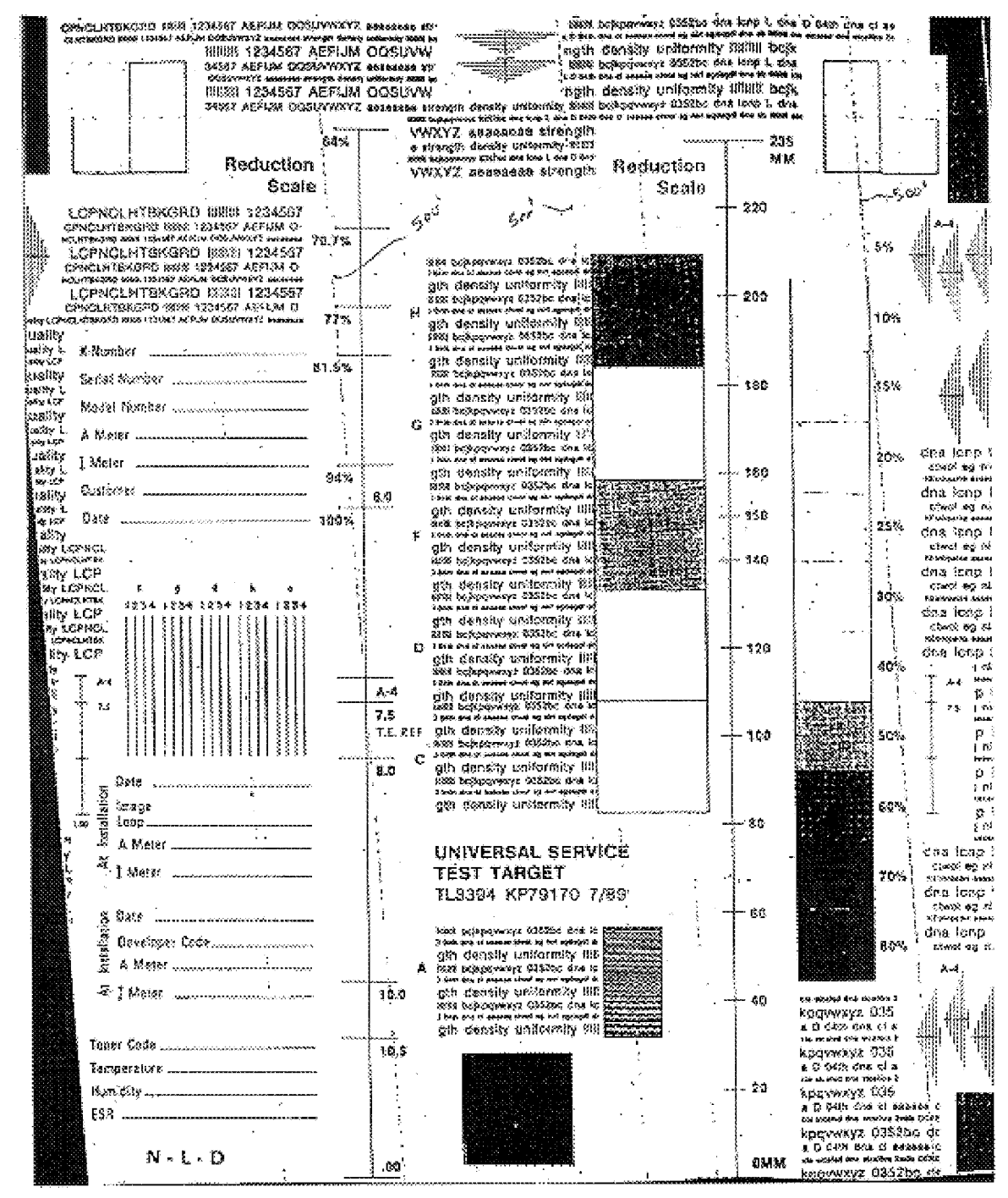

An example of a captured, skew gray scale document image using a production scanner is shown in FIG. 7A. A few light vertical line image artifacts 500 are observed due to pieces of dust blocking light between an illumination light source and the paper document being scanned. A 3.9 degree of skew angle in a clockwise direction in the image is detected. After gray scale deskewing, it was observed that the original vertical line artifacts exhibit a 3.9 degree of skew in a counter-clockwise direction in the skew corrected image of FIG. 7B. FIG. 7C is the thresholded image obtained by applying the described edge-based thresholding technique with a normal contrast setting to the skew corrected image. Since the image thresholding with a normal contrast setting attempts to extract every details of image information in the gray scale image, the pieces of unwanted, light diagonal lines (3.9 degree of skew line) in the gray scale image are also extracted and show up as pieces of broken black line segments 500' in the binary image of FIG. 7C. In the case of low contrast setting, the light contrast objects such as the light diagonal lines, light characters and any light objects are ignored in the thresholding process and they are not exhibited in the thresholded image as shown in FIG. 7D.

Figure 7D:
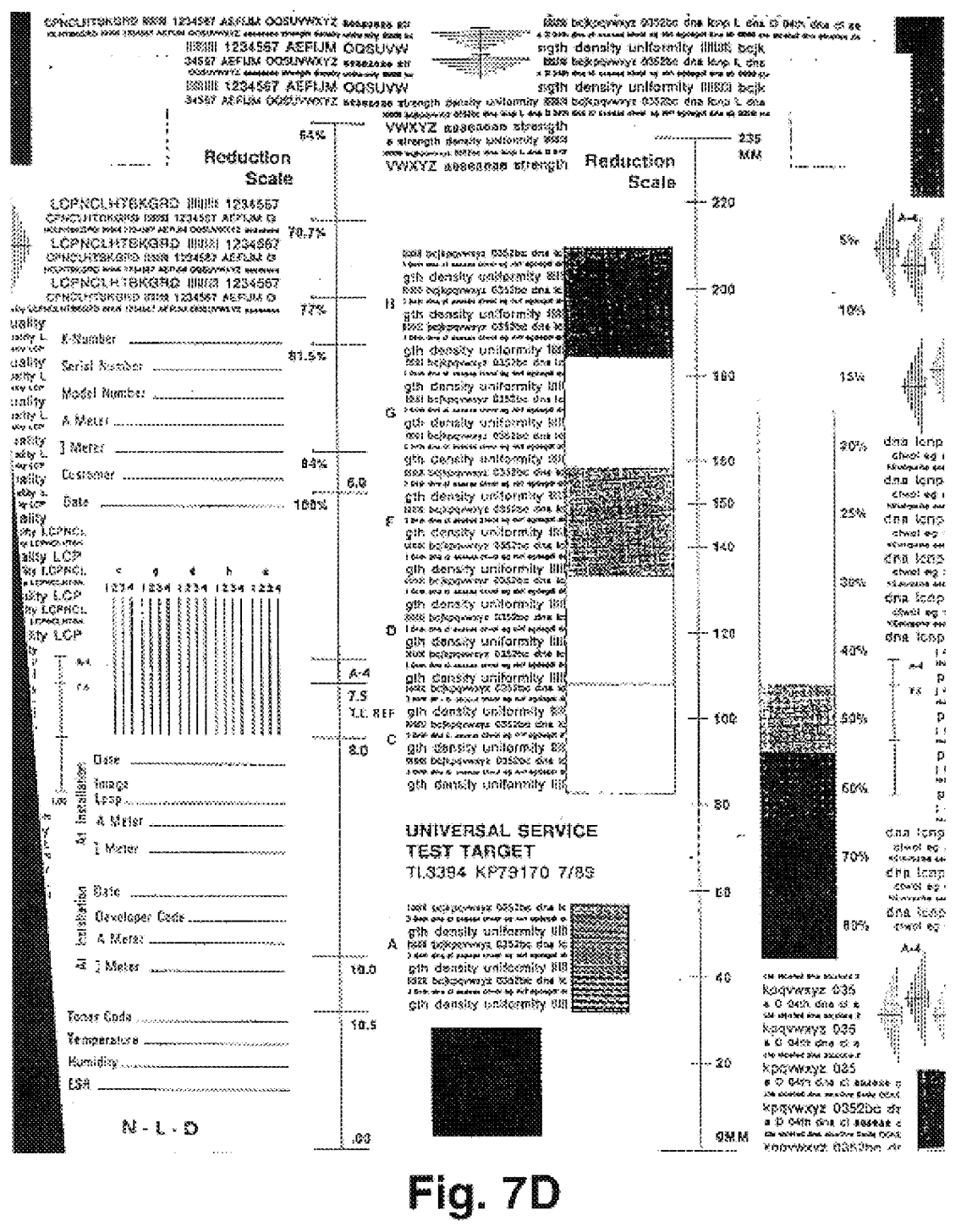
Figure 7E:
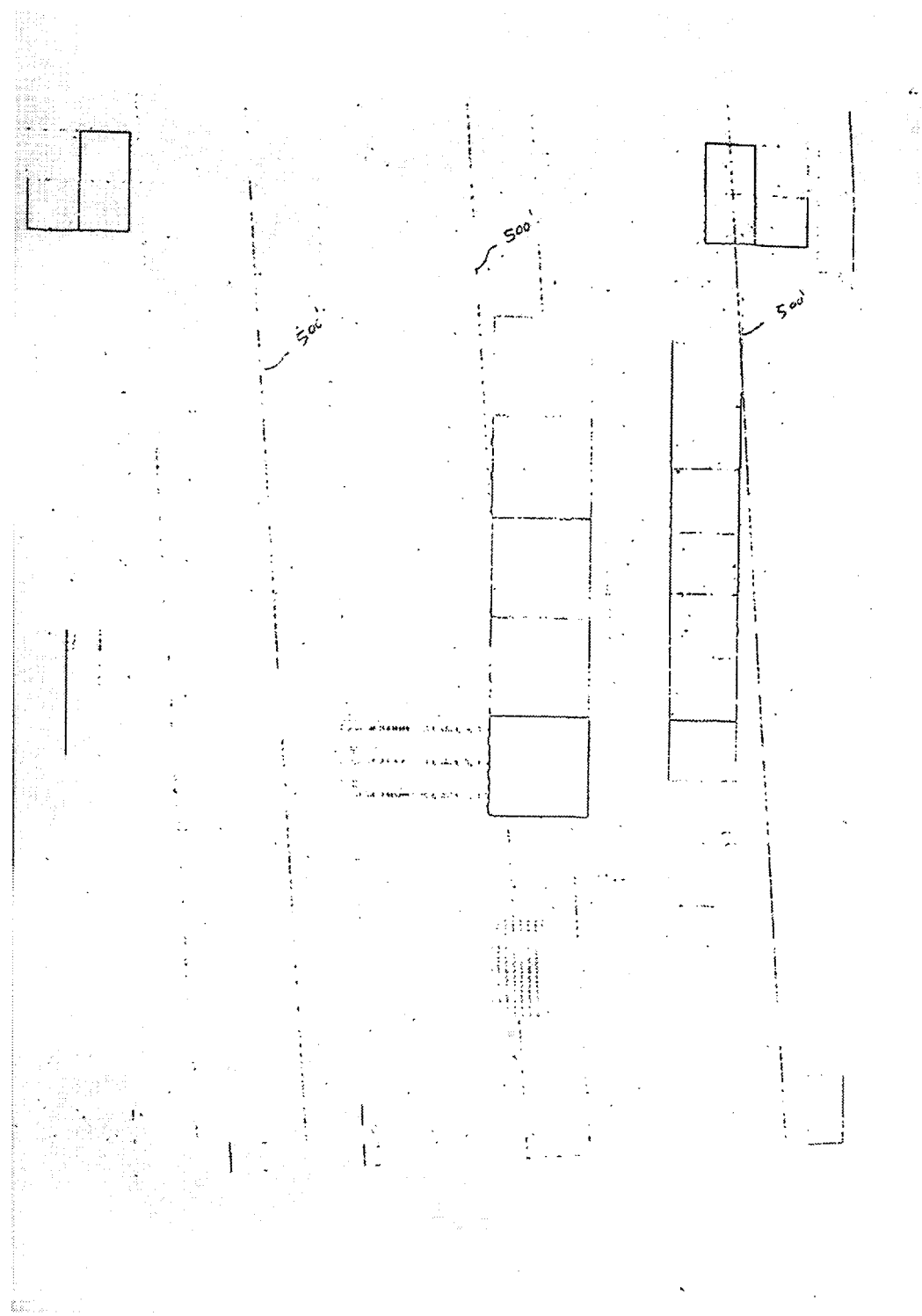
FIG. 7E is the bitmap of the difference between the binary images B1 and B2 in FIG. 7C and FIG. 7D, respectively.
Figure 7F:
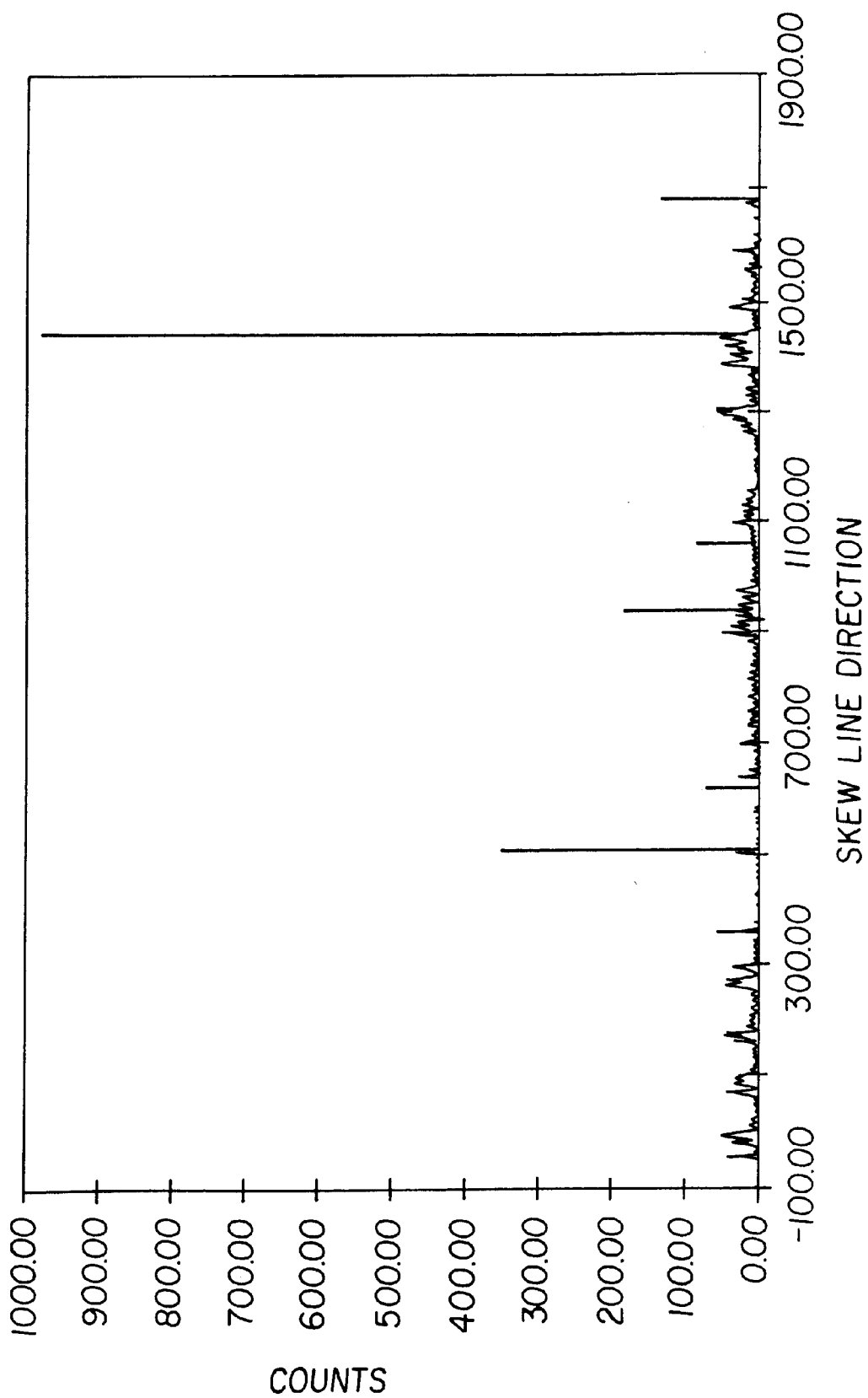
FIG. 7F is the projection profile obtained from the bitmap of FIG. 7E.

FIG. 7E is the bitmap of the two thresholded images in FIGS. 7C and 7D. The projection profile of the bitmap in FIG. 7E at a 3.9 degree angle in a counter-clockwise direction is shown in FIG. 7F. The multiple peaks in the projection profile indicate that there are multiple lines appearing in the bitmap. Setting the value of threshold at 100, there are four peaks in the projection profile detected at R=505, 930, 1450 and 1690, respectively. For a 3.9 degree skew angle in a clockwise direction, the angle (A) of the projection line as shown in FIG. 5A is equal to −3.9 degree in a counter-clockwise direction. The equations of the corresponding four straight lines are acquired as follows:

$$b505 = A*X1 + B*Y1$$

$$b930 = A*X2 + B*Y1$$

$$b1450 = A*X3 + B*Y2$$

$$1690 = A*X4 + B*X4$$

Where A=−3.9 degree; a=cos(A)=0.998, b=sin(A)=−0.068

Figure 7G:
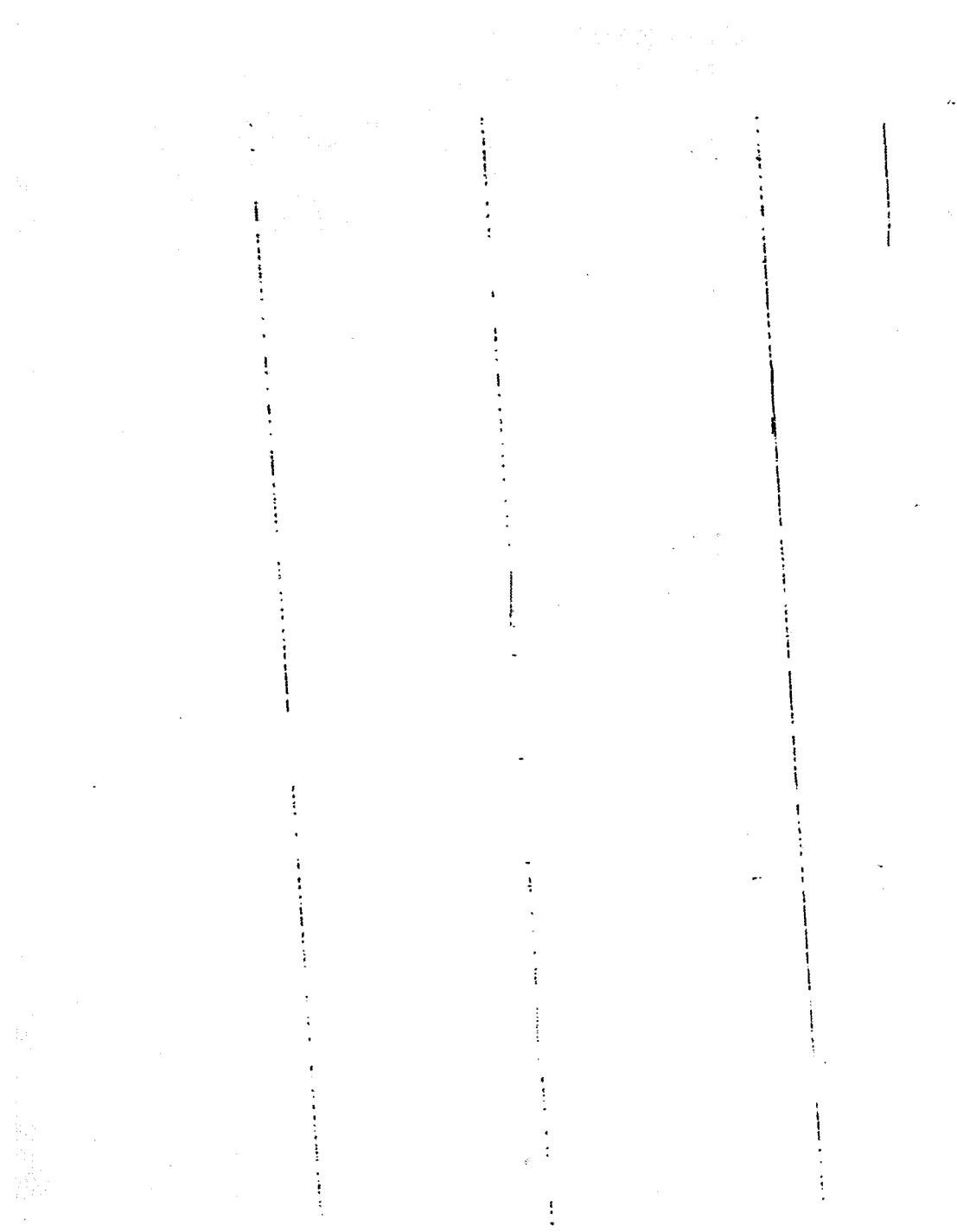
FIG. 7G is the bitmap of the detected diagonal lines.
Figure 7H:
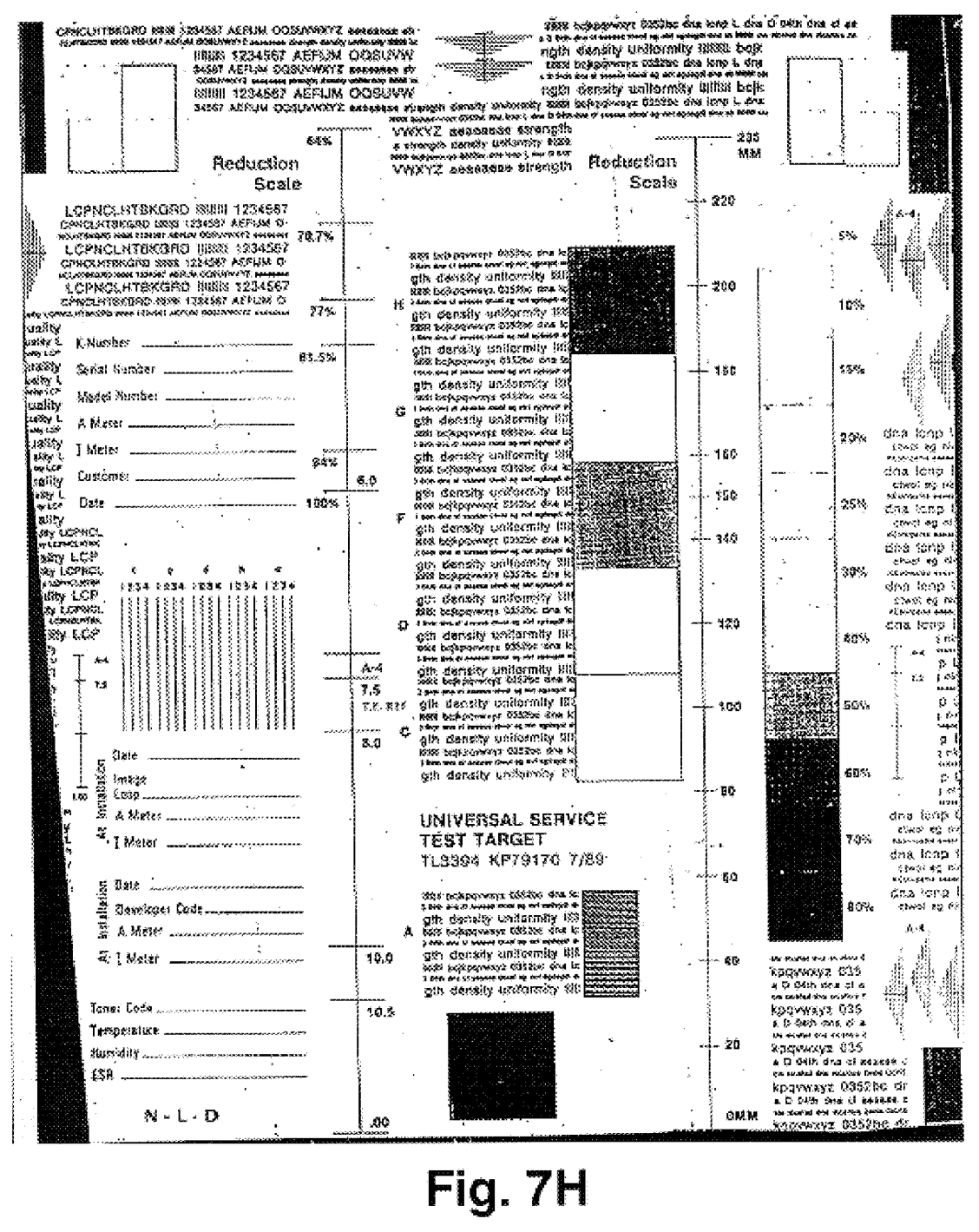

The locations of the peaks are detected by comparing the value of the count at every location with the given threshold value which is a value of 100 in the example. The peaks whose values are larger than the threshold are considered as the detected lines. According to the masking process described in the section of Line Detection mentioned above, a line bitmap is obtained and shown in FIG. 7G. FIG. 7H is the final thresholded image in which the line artifacts are removed from the bitmap of FIG. 7C.

The invention has been described in detail with particular reference to certain preferred embodiments thereof, but it will be understood that variations and modifications can be effected within the spirit and scope of the invention.

What is claimed is:

1. An image processing method for processing skew corrected images, the method comprising the steps of:

capturing a gray scale image;

deskewing said gray scale image;

converting said skew corrected image into a first binary image using a first threshold setting and a second binary image using a second threshold setting;

generating a map indicative of a difference between the first and second binary images;

projecting black pixels in said map onto a line to form a projection profile; and reversing pixels in said first binary image based on said projection profile.

2. An image processing method according to claim 1, wherein a direction of projection of said line is based on an original skew angle of said captured image.

3. An image processing method for processing skew corrected images, the method comprising the steps of:

capturing a gray scale image;

deskewing said gray scale image;

converting said skew corrected image into a first binary image using a first threshold setting and a second binary image using a second threshold setting;

comparing said first and second binary images and generating a map indicative of a difference between said first and second binary images;

projecting black pixels in said map onto a line to form a projection profile, a direction of projection of said line being based on an original skew angle of said captured image;

detecting peaks in said projection profile which are above a specified threshold and generating a line based on said detected peaks, the detected peaks corresponding to artifacts on said captured image;

masking black pixels in said map which are adjacent to said generated line; and reversing pixels in said first binary image based on said masked pixels.

4. A method according to claim 3, wherein said first and second threshold settings are edge-based image threshold settings.

5. A method according to claim 3, wherein said detected peaks represent linearly disposed artifacts in said captured image which each have the following equation:

$$R = x \cos(A) + y \sin(A);$$

wherein x and y are the coordinates of pixels in said map and A is a negative value of the skew angle of the captured image.

6. A method according to claim 3, wherein one of said first and second binary images has a normal contrast parameter, and the other of said first and second binary images has a low contrast parameter.

7. A method according to claim 3, wherein said artifact is at least one of a line, dash, or dot.

8. A method according to claim 3, wherein said captured image is a gray scale image.

9. A method according to claim 3, wherein said comparing step comprises the steps of:

comparing said first and second binary images in a pixel by pixel manner; and identifying a pixel as a black pixel if there is a difference between the compared pixels and a white pixel if there is no difference between the compared pixels to generate said map.

10. An image processing method for processing a skewed captured image, the method comprising the steps of:

deskewing the captured image;

extracting image information from said captured image and storing a resulting image as a first binary image;

extracting high contrast details from said captured image and storing a resulting image as a second binary image;

comparing said first and second binary images and generating a map indicative of a difference between said first and second binary images;

projecting black pixels in said map onto a line to form a projection profile, a direction of projection of said line being based on a skew angle of said skewed captured image;

detecting peaks in said projection profile which are above a specified threshold and generating a line based on said detected peaks, the detected peaks corresponding to artifacts on said captured image;

masking black pixels in said map which are adjacent to said generated line; and reversing pixels in said first binary image based on said masked pixels.

11. A method according to claim 10, wherein said detected peaks represent linearly disposed artifacts in said captured image which each have the following equation:

$$R = x\cos(A) + y\sin(A);$$

wherein x and y are the coordinates of pixels in said map and A is a negative value of the skew angle of the captured image.

12. A method according to claim 10, wherein said artifact is at least one of a line, dash, or dot.

13. An image capture assembly comprising:

an image capture section which captures an image;

an image deskewing section which is adapted to correct a captured image which is skewed so as to provide for a captured skewed corrected image;

a conversion section which converts said skewed corrected image into digital image information indicative of said skewed corrected captured image; and a processing section which receives said digital information and changes said skewed corrected captured image into a first binary image using a first threshold setting and a second binary image using a second threshold setting, wherein said processing section generates a map indicative of a difference between said first and second binary images, projects black pixels in said map onto a line which is oriented based on a skew angle of the captured image to form a projection profile, and reverses pixels in said first binary image based on said projection profile.

14. An assembly according to claim 13, wherein detected peaks represent linearly disposed artifacts in said captured image which each have the following equation:

$$R = x\cos(A) + y\sin(A);$$

Wherein x and y are the coordinates of pixels in said map and A is a negative value of the skew angle of the captured image.

\* \* \* \* \*